July 14, 1964   J. C. NORTON   3,141,060
METAL SHIELDED ELECTRICAL CABLE TERMINATION
Filed Nov. 7, 1961   2 Sheets-Sheet 1

INVENTOR.
JOSEPH C. NORTON
BY Francis M. Fazio
ATTORNEY

United States Patent Office 3,141,060
Patented July 14, 1964

3,141,060
METAL SHIELDED ELECTRICAL CABLE
TERMINATION
Joseph C. Norton, Charleston, W. Va., assignor to Union
Carbide Corporation, a corporation of New York
Filed Nov. 7, 1961, Ser. No. 150,770
1 Claim. (Cl. 174—73)

This invention relates to a new method for splicing and terminating electric cable. More particularly, the invention relates to splicing and terminating electric cable having metallic shielding.

Generally, metallic shielding is used in electric power cable to provide a convenient locus for effecting grounding of said cable in the event of insulation breakdown and faults to ground. In addition, metallic shielded electric cable is readily adapted to ground fault relaying schemes by providing a ground fault current return path for the relaying system. Metallic shielded cable is also employed to provide electropotential stress relief within, and on the surface of, insulation of power cables operating at a voltage of above about 3000. Further, metallic shielded cable is advantageously employed to contain high-frequency potentials in radio and television transmission and preclude such potential from being induced into other adjacent cable, and, conversely, to preclude receiving unwanted induced potentials from adjacent cable.

Since high potentials and/or high frequencies are to be contained and controlled by use of metallic shielding, it is evident that an efficient and safe splice must be flawless to preclude electrical flashover and to reduce the hazard of electrical shock. At a splicing juncture, the metallic shielding of one cable must be electrically connected to the metallic shielding of the other cable, the splice must have insulation characteristics that are at least equal to those of the original cable insulation, the splice must contain no air pockets, and the metallic shielding material should bear directly against the insulating material.

Although numerous methods for splicing ordinary, nonmetallic shielded cable have been developed, the rigorous requirements of an effective metallic-shield splice have heretofore been met only by relatively time-consuming, expensive, and cumbersome techniques.

Briefly, a typical prior art method involves the following, in splicing a typical metallic-shield cable comprising essentially a conductor, insulation surrounding the conductor, metallic shielding tape covering said insulation, and a jacket encasing the conductor, insulation, and metal shielding tape. After exposing the conductor by removing the jacket from the cable ends to be joined, winding back the metallic shielding tape, and stripping and pencilling the insulation, the conductor ends are joined with a connecting sleeve of the indented type. The sleeve is covered with a filler compound to fill all holes and to obtain a smooth finish. Biseal insulating tape is applied to cover the sleeve and the pencilled portion of the insulation so as to form di-electric stress relief cones coaxial with the cable and extending outward radially from the centerline of the conductor towards the joint midpoint. Four or five additional tape layers are applied to give the proper electrical resistance characteristics. One exposed end of the metallic shielding tape is soldered to a length of copper mesh tape and a suitable ground wire is soldered to the junction. The copper mesh tape is then wound three-fourths of the way across the length of the joint, said length being defined as the exposed distance between the adjacent jacket ends, and is then tightly wrapped back toward the starting end and tied off with solid wire. Similarly, the other exposed metal tape end is soldered to another length of copper mesh wire and similarly wound so that the copper mesh tapes overlap near the center of the joint. Finally, four layers of vinyl tape are wrapped across the joint and two layers of friction tape are applied to provide an outer cover. As each step in this splicing procedure must be carried out carefully and precisely, it is evident that considerable operator skill is required and that this method is quite time-consuming and expensive.

The present invention eliminates disadvantages of previous methods by providing a simple, straightforward splicing technique requiring relatively little operator skill and time and thereby greatly reducing labor cost, while producing a safe, efficient joint.

In accordance with the method of the present invention the ends of the cable sections to be joined are exposed and the conductor ends are linked by conventional means. Electrical continuity across the joint is effected by a metallic shield comprising an open-ended tubular member which is soldered to the metallic shielding tape circumferentially at both ends, thereby providing a casing into which is poured an insulating compound to surround the conductor and completely fill the void between the exposed cable ends and the metallic shield. Thus the metallic shield serves the dual function of providing electrical continuity across the joint while simultaneously providing a casing for pouring an insulating compound.

A fuller understanding of this invention and an embodiment thereof may be had by referring to the following description and claim, taken in conjunction with the accompanying drawings in which:

FIGURES 4–6 illustrate the method of this invention as applied in terminating metallic-shielded electrical cable.

FIGURE 4 is a side elevation of a cable end which has been prepared in a conventional manner to be terminated.

FIGURE 5 is a side elevation showing the placing of a metallic shield to the exposed cable end of FIGURE 4.

FIGURE 6 is a side elevation showing the placing of a non-conductive sleeve to the partially completed termination of FIGURE 5.

Figure 1:
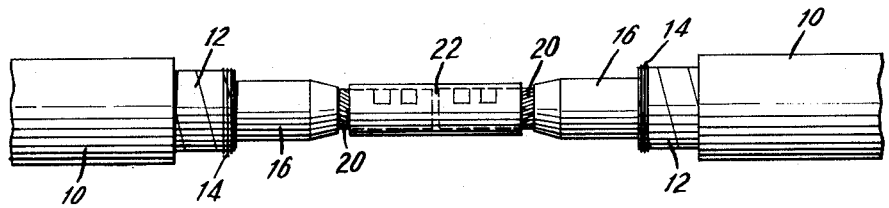
FIGURE 1 is a side elevation of two cable ends which have been prepared in a conventional manner to be spliced.
Figure 2:
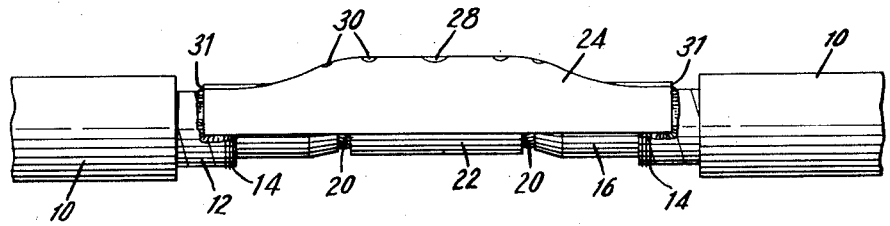
FIGURE 2 is a side elevation showing the placing of the top part of a metallic shield to the exposed joint of FIGURE 1.
Figure 3:
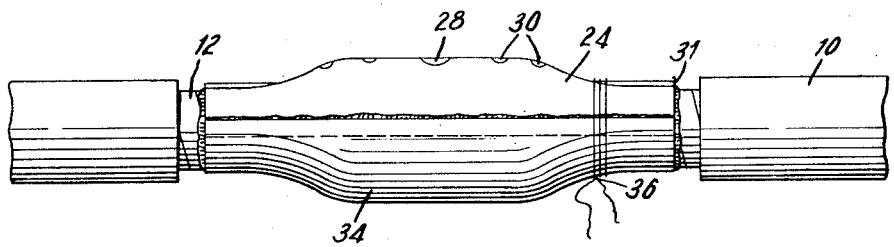
FIGURE 3 is a side elevation showing the placing of the bottom part of the metallic shield to the partially completed splice of FIGURE 2.

As shown in FIGURE 1 the cable to be spliced comprises a conductor 20, insulation means 16, metallic shielding tape 12, and a jacket 10. The cable ends have been prepared for splicing by cutting and removing jacket 10, unwinding metallic shielding tape 12 to point 14 where it is held in place by a few turns of solid wire, pencilling the exposed insulation 16 to the conductor 20, and joining the bare conductor ends by means of a connecting sleeve of the indented type 22. The metallic shield used in this embodiment of the invention comprises an upper member 24, as shown in FIGURE 2, and a lower member 34, as shown in FIGURE 3, which, when joined, form an open-ended tubular member. In FIGURE 2 the upper member 24, provided with a liquid inlet opening 28 and air escape openings 30 and indented to provide additional air escape openings at 31, has been placed on the exposed joint of FIGURE 1 so that the ends of said upper member 24 make circumferential contact with the wound-back metallic shielding tape 12. The upper member 24 is soldered to metallic shielding tape 12 to provide an efficient electrical connection. With the upper member 24 in place, the lower member 34 is placed on the remaining exposed portion of the joint, as shown in FIGURE 3, to make circumferential contact with metallic shielding tape 12 and longitudinal contact with upper member 24. The lower member 34 is soldered to metal tape 12 and also to upper member 24. If desired, a suitable grounding wire may be attached at any point, such as 36, on upper member 24 or lower member 34. A liquid insulating compound with suitable dielectric properties is introduced through inlet opening 28. While the liquid fills the void between the exposed joint and the metallic shield, air escapes through openings 30 and 31 until the void is filled and insulating liquid begins to exit from air escape openings 30 and 31 and inlet opening 28. The openings are sealed by taping or other means to prevent further escape of insulating liquid and the liquid is allowed to harden. After the insulating liquid has fully set, conventional tapings can be applied across the entire joint to provide a waterproof jacket.

Termination of metallic-shielded electric cable is also readily accomplished by proceeding in accordance with the present invention. With reference to FIGURE 4, a cable end has been prepared for termination by cutting back jacket 40, winding back metallic shielding tape 42, pencilling insulation 46 to conductor 50, and applying a connecting lug 52 to the bare conductor, in conventional fashion. The connecting lug 52 is adapted to be electrically connected to a motor, bus bar, and the like. The metal tape 42 is terminated in accordance with the present invention by utilization of an open-ended conical metal member. In the specific embodiment shown in FIGURES 5 and 6, a semi-conical upper member 54 and a semi-conical lower member 64 are placed on metal tape 42 so that the smaller diameter end of the resulting cone-shaped metallic shield makes circumferential contact with said tape, and the members 54 and 64 make longitudinal contact with each other. The upper member 54 and lower member 64 are then soldered to metal tape 42 and to each other. In FIGURE 6, a non-conductive, open-ended conical sleeve member 70 is placed on insulation 46 and its larger diameter open end is joined circumferentially to the larger diameter open end of the metal cone-shaped shield comprised of upper member 54 and lower member 64. Conical sleeve member 70 is provided wtih a pouring spout 72 and with at least one air escape opening 73. If desired, a ground wire 74 may be attached to upper member 54 or lower member 64. With the complete shield in place as shown in FIGURE 6, a liquid insulating compound with suitable dielectric properties is introduced through pouring spout 72 to fill the void between the exposed insulation and the shield. The opening 73 and spout 72 can be sealed by taping or other means and the insulating liquid is allowed to harden. After the insulating liquid has fully set, the spout can be sawed off and conventional tapings can be applied to the entire termination assembly to provide a waterproof jacket.

It is apparent that many embodiments other than those described above are possible in the utilization of the present invention. For example, the tubular metallic shield employing such a one-piece member, it may be necessaryhalves, may consist of a thin one-piece longitudinally slit tubular metal member of sufficient flexibility to allow its being snapped around the joint to be shielded. When employing such a one-piece member, it may be necessary to use a self-hardening liquid that develops good mechanical strength on setting, or, alternatively, to place a non-conductive, mechanically strong cover on the joint or termination assembly. The tubular shield member may also comprise two halves where each of the halves is a combined metallic shield and non-conductive cover joined together by a tongue-and-groove or other connecting means. Such an embodiment is less preferred, however, in that greater care is required to exclude air pockets and to insure an effective electrical connection.

The liquid insulating compounds employed in this invention are those having desirable properties such as high initial fluidity, rapid cure, firm adherent bond to all contacted surfaces, and particularly, suitable dielectric properties. A suitable liquid insulating compound is, for example, a mixture of a liquid epoxy resin with a minor proportion of liquid polythiopolymercaptan polymer and, as an activator, a liquid polyamine. "Epon No. 562" is a typical commercial example of the epoxy resin, "Thiokol polymer LP–2" is illustrative of the polysulfide polymer, and 2,4,6-tri(dimethylaminomethyl)phenol is exemplary of the polyamine activator. The several components may be separately measured and all combined at the same time. More desirably, the amine and the polysulfide polymer are separately mixed together, and this mixture is combined with the epoxy resin just prior to pouring the composite around the splice. Mixing is conveniently accomplished in a flexible plastic bag, from which the mixture is poured directly into the open spout of the metallic shield. A more detailed discussion of suitable resins and modes for the preparation of suitable liquid mixtures can be found, for example, in U.S. Patent 2,792,441, granted to R. C. Platow on May 14, 1957. The liquid insulating compound can be introduced into the void to be filled by gravity or by applying vacuum or pressure.

Many modifications and alternative embodiments of the invention will be apparent to those skilled in the art without departure from the spirit and scope of this invention, it being understood that the foregoing disclosure has been given by way of example for clearness and understanding only and no unnecessary limitations should be implied therefrom.

What is claimed is:

A cable termination assembly for high-voltage metallic shielded cable having conductor means, insulating means surrounding said conductor means, and metallic shielding means surrounding said insulating means, which termination assembly comprises an open-ended conical metal member and an open-ended conical non-conductive member, the small-diameter end of said metal member making circumferential electrical contact with said metallic shielding means of the cable end to be terminated, and the large-diameter end of said metal member being joined circumferentially to the large-diameter end of said non-conductive member, and the small-diameter end of said non-conductive member making circumferential contact with said insulating means, and said termination assembly being filled with an insulating compound.

References Cited in the file of this patent

UNITED STATES PATENTS

| | | |
|---|---|---|
| 296,185 | Kruesi | Apr. 1, 1884 |
| 2,133,448 | Harley | Oct. 18, 1938 |
| 2,312,652 | Komives et al. | Mar. 2, 1943 |
| 2,522,572 | Fengler et al. | Sept. 19, 1950 |
| 2,930,835 | Bollmeier | Mar. 29, 1960 |
| 3,018,318 | Franklin | Jan. 23, 1962 |

FOREIGN PATENTS

| | | |
|---|---|---|
| 464,801 | Great Britain | Apr. 26, 1937 |

UNITED STATES PATENT OFFICE
CERTIFICATE OF CORRECTION

July 14, 1964

Patent No. 3,141,060

Joseph C. Norton

It is hereby certified that error appears in the above numbered patent requiring correction and that the said Letters Patent should read as corrected below.

Column 3, line 58, beginning with "employing such" strike out all to and including "shielded. When", in line 61, same column 3, and insert instead -- employed in this invention, instead of comprising two halves, may consist of a thin one-piece longitudinally slit tubular metal member of sufficient flexibility to allow its being snapped around the joint to be shielded. When --.

Signed and sealed this 17th day of November 1964.

(SEAL)
Attest:

ERNEST W. SWIDER
Attesting Officer

EDWARD J. BRENNER
Commissioner of Patents